United States Patent [19]
Bessette et al.

[11] Patent Number: 5,662,340
[45] Date of Patent: Sep. 2, 1997

[54] FULLY SPLIT CARTRIDGE MECHANICAL SEAL ASSEMBLY

[75] Inventors: Roger F. Bessette, Essex Junction; L. Kimball Simmons, Williston; Gary S. Proulx, Shelburne; Todd S. Blow, Grand Isle, all of Vt.

[73] Assignee: Flex A Seal, Inc., Essex Junction, Vt.

[21] Appl. No.: 629,164

[22] Filed: Apr. 8, 1996

[51] Int. Cl.⁶ ................................................. F16J 15/38
[52] U.S. Cl. ................................ 277/9.5; 277/11; 277/38; 277/40; 277/815
[58] Field of Search ......................... 277/9.5, 11, 38, 277/39, 40, 41, 81 R, 81 S, 85

[56] References Cited

U.S. PATENT DOCUMENTS

| | | | |
|---|---|---|---|
| 4,538,820 | 9/1985 | Duffee | 277/11 |
| 4,576,384 | 3/1986 | Azibert | 277/81 S |
| 4,872,689 | 10/1989 | Drumm | 277/9.5 |
| 5,114,163 | 5/1992 | Radosav et al. | 277/81 S |
| 5,116,066 | 5/1992 | Crawford | 277/81 R |
| 5,275,421 | 1/1994 | Hornsby | 277/81 R |
| 5,356,158 | 10/1994 | Simmons et al. | 277/9.5 |
| 5,370,401 | 12/1994 | Sandgren | 277/9.5 |

OTHER PUBLICATIONS

"Seals and Sealing Handbook", Gulf Publ. Co.; pp. 40–41. Jul. 1986.

*Primary Examiner*—Scott Cummings
*Attorney, Agent, or Firm*—Thomas N. Neiman

[57] ABSTRACT

The fully split cartridge mechanical seal assembly is comprised of two unitized self contained assemblies which fit together to form a unitized cartridge design. The assembly uses set screws to position the seal assembly to the rotating shaft or sleeve and slots in the gland to receive attaching means to a fixed stationary or chamber. The stationary components of the assembly include the following: a split stationary seal ring, a split stationary seal ring packing, springs set into apertures in the split gland, the split gland, the split gland gasket, gland bolts, a gland split gasket, and setting clips and screws. The rotating components include the following: a split rotary seal ring, split rotary seal ring packing, a split sleeve, the split sleeve packing, the sleeve bolts, cup point set screws, and sleeve split gasket. The fully split cartridge mechanical seal design eliminates the handling of a lot of loose, delicate, precise manufactured components and allows for very simple, easy and time saving installation with no measurements or guess work.

6 Claims, 2 Drawing Sheets

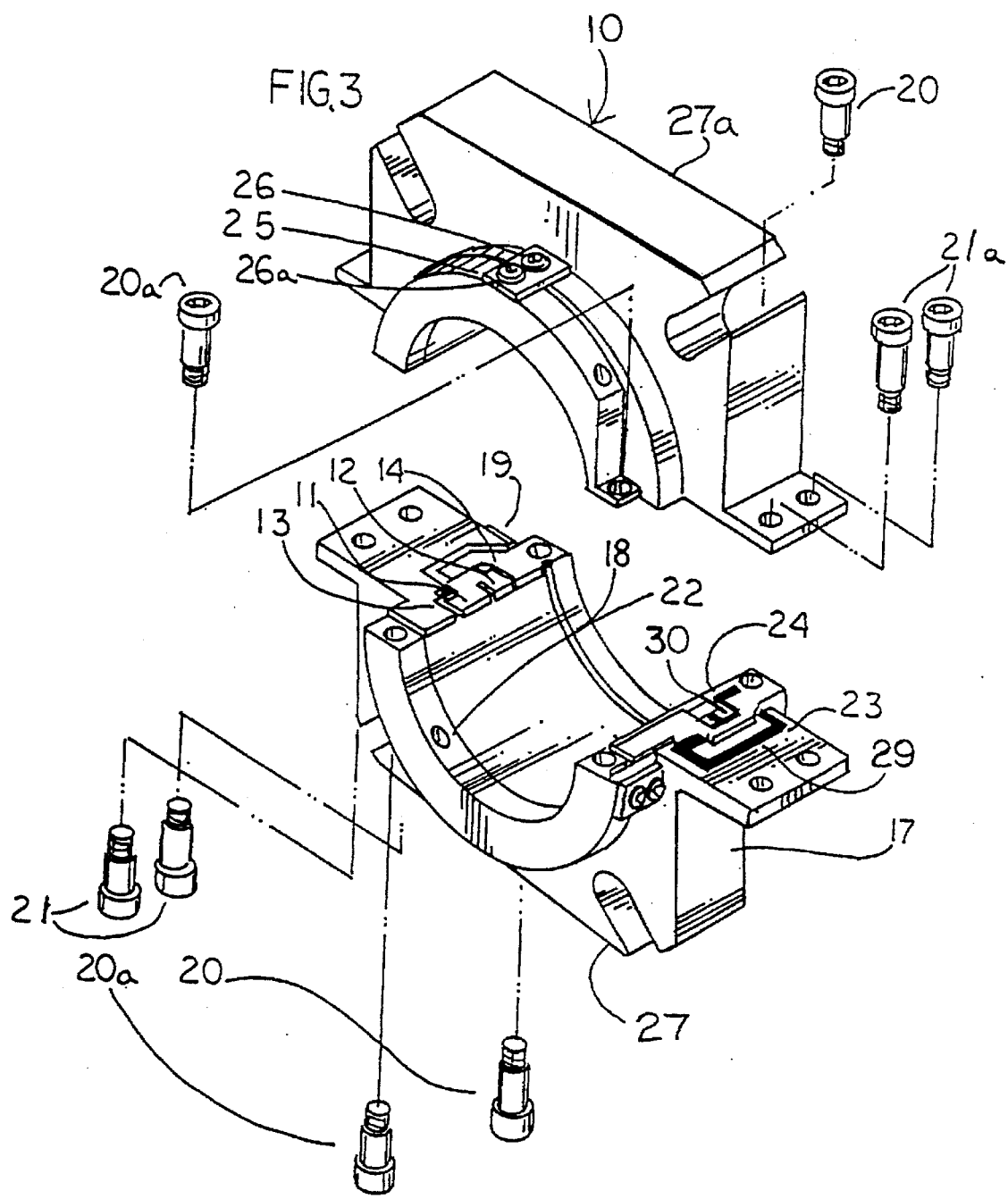

FULLY SPLIT CARTRIDGE MECHANICAL SEAL ASSEMBLY

BACKGROUND OF THE INVENTION

This invention pertains to mechanical sealing assemblies, and in particular to such sealing assemblies that use a fully split cartridge mechanical seal assembly, for use in overcoming inherent handling and assembly problems, due to the complexity of the multitude of delicate components and loose parts and the difficulty of fitting them together precisely and accurately to insure a proper seal.

Mechanical seals are well known in the field and the difficulties found in these systems are well known. Since mechanical seals are Subjected to wear, corrosion, abrasion vibration, thermal, pressure and other effects, they must be replaced periodically. This normally may require the removal of the coupling, bearings and motor which can be a very involved and costly procedure with a lot of resulting down time for the equipment. By splitting the mechanical seal allows for the assembly and disassembly of the seal without dismantling the equipment.

There have been a number of attempts to deal with these difficulties. Examples of these type devices include the United States Patent issued to Azibert, U.S. Pat. No. 4,576,384 on 18 Mar. 1986 and the United States Patent issued to Ballard U.S. Pat. No. 4,576,383 also issued on 18 Mar. 1986. A U.S. Pat. No. 3,025,070 issued to J. C. Copes for a Split Mechanical Seals on 13 Mar. 1962 is another example of standard mechanical seals. The general function of these references and a number of others in the art is to have a rotating seal assembly attached to a shaft or sleeve and a non-rotating seal assembly attached to a stationary housing or chamber surrounding the shaft or sleeve. However, all of these designs and many others still have inherent problems. The primary difficulty is that these devices have a great number of loose parts that must be handled with extreme care, especially the two precision manufactured primary faces to insure good seal performance and life. They also require measurements, or the use of various shims or special tools to set and align the seal assembly accurately. They typically use internal clamping designs with their limitations of torsional and axial holding power to locate on the rotating shaft or sleeve and cannot be moved after setting without complete disassembly of the seal if readjustment is required. Some also require a receiving unit on the outer faces of the outer flange of the stationary hounding or chamber which assists the concentricity of the seal assembly to the rotating shaft.

It is the object of this invention, then to set forth a split mechanical seal assembly which avoids the disadvantages limitations, above-recited, which obtain in prior mechanical sealing apparatus. It is also the object of this invention to teach a fully split cartridge mechanical seal assembly that can be positioned on a rotating shaft or sleeve easily and quickly and which will eliminate many of the problems found in standard mechanical sealing systems.

SUMMARY OF THE INVENTION

Particularly, it is the object of this invention to set forth a fully split cartridge mechanical seal assembly, for use in situations that use rotating equipment, such as pumps, agitators and mixers that are difficult and time consuming to disassemble, comprising two unitized self contained assemblies; said unitized self contained assemblies having means for attaching said unitized self contained assemblies over a rotating shaft or sleeve; said complete solid cylindrical assembly having setting means for aligning and retaining said complete solid cylindrical assembly in position and for removing said complete solid cylindrical assembly after permanently attached; said complete solid cylindrical assembly having fastening means for connecting said complete solid cylindrical assembly to a fixed stationary housing or chamber; and attaching means for connecting said complete solid cylindrical assembly rotating portion to said rotating shaft or sleeve.

BRIEF DESCRIPTION OF THE INVENTION

Further objects and features of this invention will become more apparent by reference to the following description taken in conjunction with the accompanying figures, in which:

FIG. 3 is an isometric exploded view of the novel fully split cartridge mechanical seal assembly.

DETAILED DESCRIPTION OF THE PREFERRED EMBODIMENTS

Figure 1:
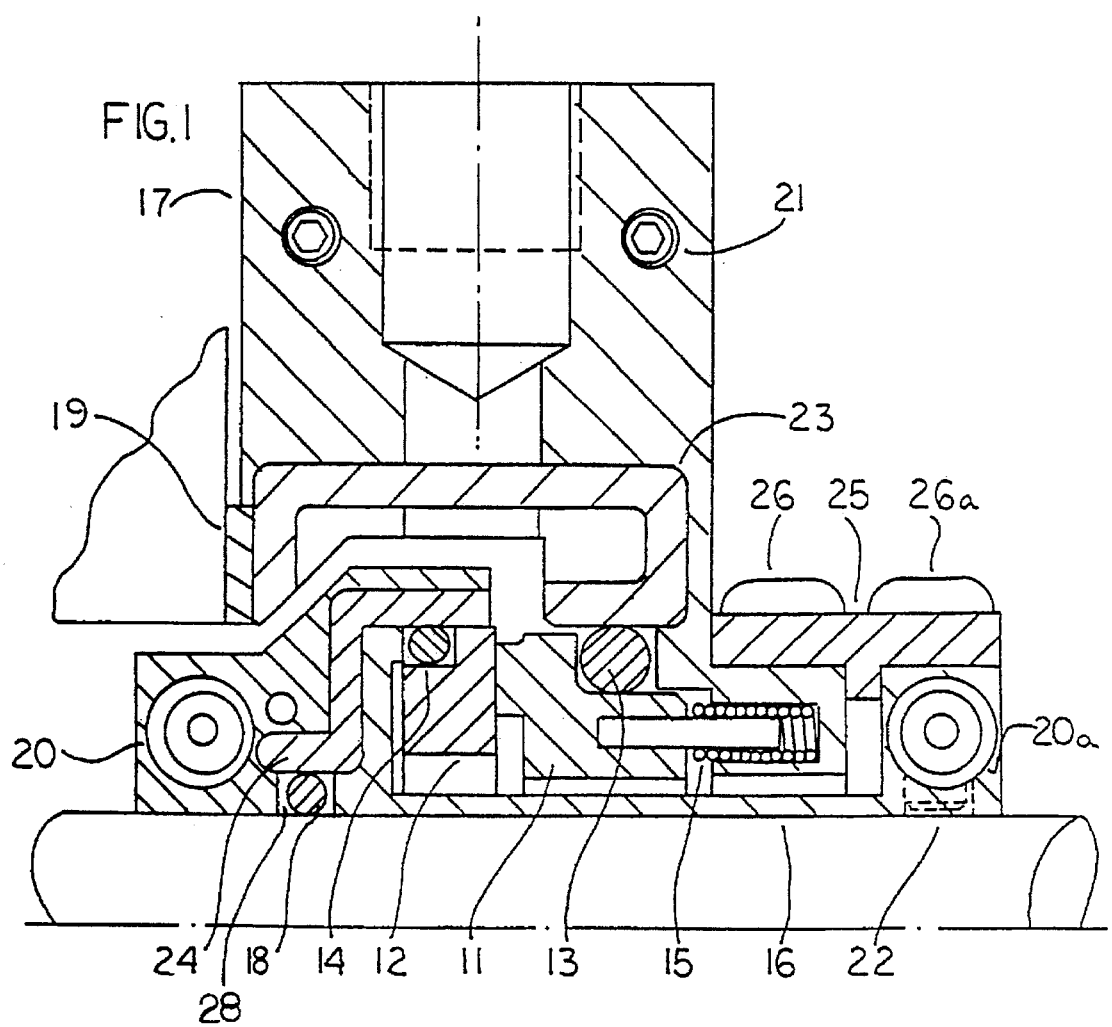
FIG. 1 is a fragmentary cross-sectional view of the fully split cartridge mechanical seal assembly.
Figure 2:
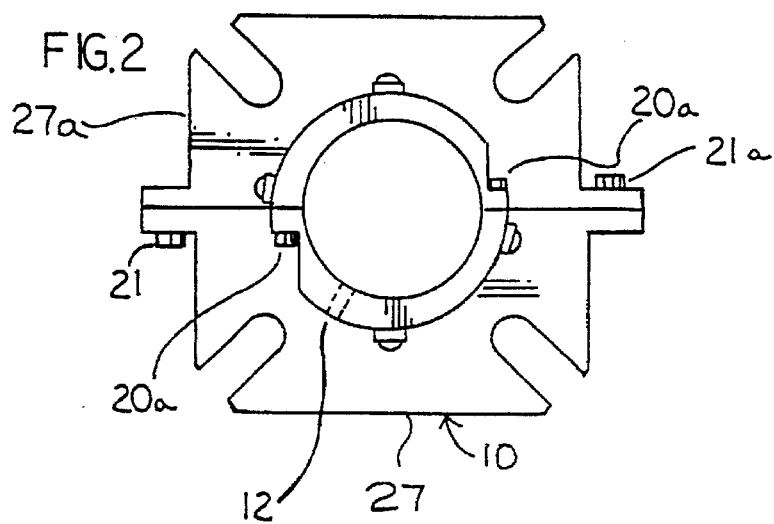
FIG. 2 is an isometric view of the completed assembly thereof.

As shown in the figures, the fully split cartridge mechanical seal assembly 10 comprises two unitized split seal assemblies 27 and 27a. Each of the units have a split stationary seal ring 11 and a split rotary seal ring 12. The secondary seals are the split stationary seal ring packing 13 and the split rotary seal ring packing 14. A split gland 17 contains one half of the split stationary seal ring 11 and half of the split stationary seal ring packing 13, along with half of the spring 15 inserted into apertures in the split gland 17 in order to provide the axial closing force and half of the split gland gasket 19 which is the static gasket between the split gland 17 and the face of the stationary housing or chamber. The split sleeve 16 contains one half of the split rotary seal ring 12 and the split rotary seal ring packing 14 and the cup point set screws 22 and the split sleeve packing 18 positioned in groove 28. The cup point set screws 22 tighten in threaded apertures in the split sleeve 16 and will indent into the pump shaft or sleeve to hold the split cartridge mechanical seal assembly in place. The split sleeve packing 18 is the static seal between the split seal sleeve 16 and the rotating shaft or sleeve. The sleeve bolts 20 and 20a connect the split sleeve 16 halves and firmly hold them together. The gland bolts 21 and 21a connects the split gland halves 17 and holds them together. The gland split gasket 23 is the static gasket that fits into a groove 29 on one side of each of the split gland halves 17 and provides a seal between the two halves. The sleeve split gasket 24 is the static gasket which fits into a groove 30 on one side of each of the split sleeve halves 16 in order to provide a seal between the two halves. The setting clips 25 use two button head screws 26 and 26a to set the seal assembly both radially, axially and retaining the unitized self contained assemblies 27 and 27a. One of the screws is inserted into the split gland 17 and the other into the split sleeve 16.

The split seal assembly has a distinct advantage over conventional mechanical seal designs in that the total time to install the seal is greatly reduced since the pump, mixer or other rotating equipment doesn't have to be dismantled. In using two unitized self contained assemblies, the assembly is a fully split cartridge mechanical seal design. This eliminates inherent handling problems which can effect the sealing performances of the critical primary sealing faces. The split stationary seal ring 11 and the split rotary seal ring 12 are both protected by being inside the split gland halves 17 and the split sleeve halves 16. Another improvement that is used by our design is that set screws are used to position the fully split cartridge mechanical seal assembly to the rotating shaft or sleeve. The method employed by previous designs does not have the axial and torsional holding power that by the using the set screw will have. Also, the cartridge design feature can be used when the pump impeller clearance requires adjustment. It does not require the disassembly, assembly and resetting that other designs require. The assembly is precision manufactured to insure accurate assembly and compression of the seal for a perfect fit. The flat portion of the gland adds a couple of valuable features to the assembly. The obvious feature is a reduction of the overall weight of the unit which makes it easier to handle.

While we have described our invention in connection with specific embodiments thereof, it is clearly to be understood that this is done only by way of example and not as a limitation to the scope of our invention as set forth in the objects thereof and in the appended claims.

We claim:

1. A fully split cartridge mechanical seal assembly, for use in situations that require a sealing device on rotating equipment, that can be difficult and time consuming to disassemble, comprising:

two unitized self contained assemblies;

said unitized self contained assemblies having means for attaching said unitized self contained assemblies over a rotating shaft or sleeve;

said unitized self contained assemblies comprising one half of a split gland assembly and one half split sleeve assembly;

said split gland assembly having one half of a split stationary seal ring positioned within said split gland assembly for use as one half of one of the primary seal faces;

said split stationary seal ring having one half of a split stationary seal ring packing for use as one half of one of the secondary seals;

said split gland assembly further having apertures positioned therein;

said split gland assembly further having springs located therein said apertures for providing an axial closing force;

said split gland assembly further having one half of a split gland gasket for use as a seal to the face of the stationary housing or chamber;

said split gland assembly further having locking means for connecting each of said split gland assemblies together;

said split sleeve assembly having one half of a split rotary seal ring positioned within said split sleeve assembly for use as one half of one of the primary seal faces;

said split rotary seal ring having one half of a split rotary seal ring packing for use as one half of one of the secondary seals;

said split sleeve assembly having one half of a split sleeve packing fitted into a groove for use as a static seal between said split sleeve component and said rotating shaft or sleeve;

said split sleeve assembly further having locking means for connecting each of said split sleeve assemblies together;

said unitized self contained assemblies having retaining and setting means;

said retaining and setting means comprising setting clips;

said setting clips having locking screws one inserted into an aperture in said split gland assembly and one inserted into an aperture in said split sleeve assembly for holding together one half of said split gland assembly and one half of said split sleeve assembly;

said setting clips comprising means for setting said fully split cartridge mechanical seal assembly both axially and radially for the purposes of eliminating the typical required measurements, or the using of various shims or special tools to set and align the seal into the proper operating position;

the complete solid cylindrical assembly having setting means for aligning and retaining said complete solid cylindrical assembly in position;

said complete solid cylindrical assembly having fastening means for connecting said complete solid cylindrical assembly to a fixed stationary housing or chamber;

attaching means for connecting said complete solid cylindrical assembly rotating portion to said rotating shaft or sleeve; and said setting means being removed after said complete solid cylindrical assembly has been permanently attached.

2. A fully split cartridge mechanical seal assembly, according to claim 1, wherein:

said split gland assemblies having a groove therein between each of said split gland assemblies when said assemblies are locked together;

said groove therein said split gland assemblies having a predetermined accurately controlled depth held to specific, minimum tolerances for insuring proper compression of the gland split gaskets;

said groove therein said split gland assemblies further having a smooth surface finish for the sealing of all leak paths; and each half of said split gland assemblies further having a gland split gasket to be inserted within said grooves in each half of said split gland assemblies.

3. A fully split cartridge mechanical seal assembly, according to claim 1, wherein:

said split sleeve assemblies having a groove therein between each of said split sleeve assemblies when said assemblies are locked together;

said groove therein said split sleeve assemblies having a predetermined accurately controlled depth held to specific minimum tolerances for insuring proper compression of the sleeve split gaskets;

said groove therein said split sleeve assemblies further having a smooth surface finish for the sealing of all leak paths; and each half of said split sleeve assemblies further having a split sleeve gasket to be inserted within said grooves in each half of said split sleeve assemblies.

4. A fully split cartridge mechanical seal assembly, according to claim 1, wherein:

said split sleeve assemblies have positioning means; and said positioning means comprise set screws inserted in threaded apertures in said split sleeve assemblies for locking said fully split cartridge mechanical seal assembly against said rotating pump shaft or sleeve.

5. A fully split cartridge mechanical seal assembly, according to claim 1, wherein:

said split gland assembly having attaching means to said fixed stationary housing or chamber;

said attaching means comprises slots for receiving bolts; and said slots comprise variably sized receiving means for different types of equipment with the same size shaft or sleeve.

6. A fully split cartridge mechanical seal assembly, according to claim 1, wherein:

said split gland assembly having connection means for allowing the flushing, recirculating and venting of said fully split cartridge mechanical seal assembly.

* * * * *